J. VAN N. DORR.
THICKENER.
APPLICATION FILED OCT. 2, 1917.
1,356,608.
Patented Oct. 26, 1920.
4 SHEETS—SHEET 4.
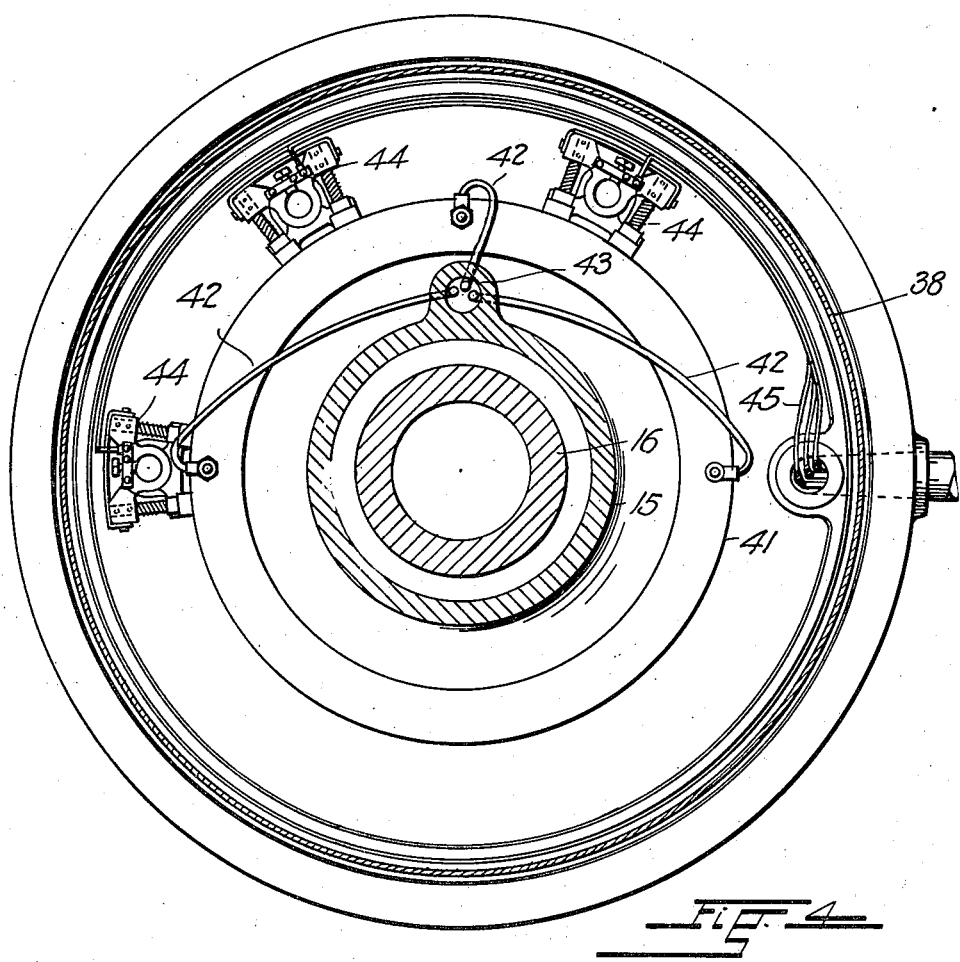
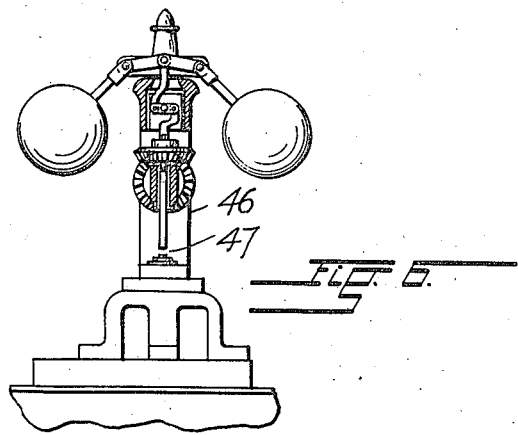
INVENTOR
J.V.N. DORR.
BY
ATTORNEY

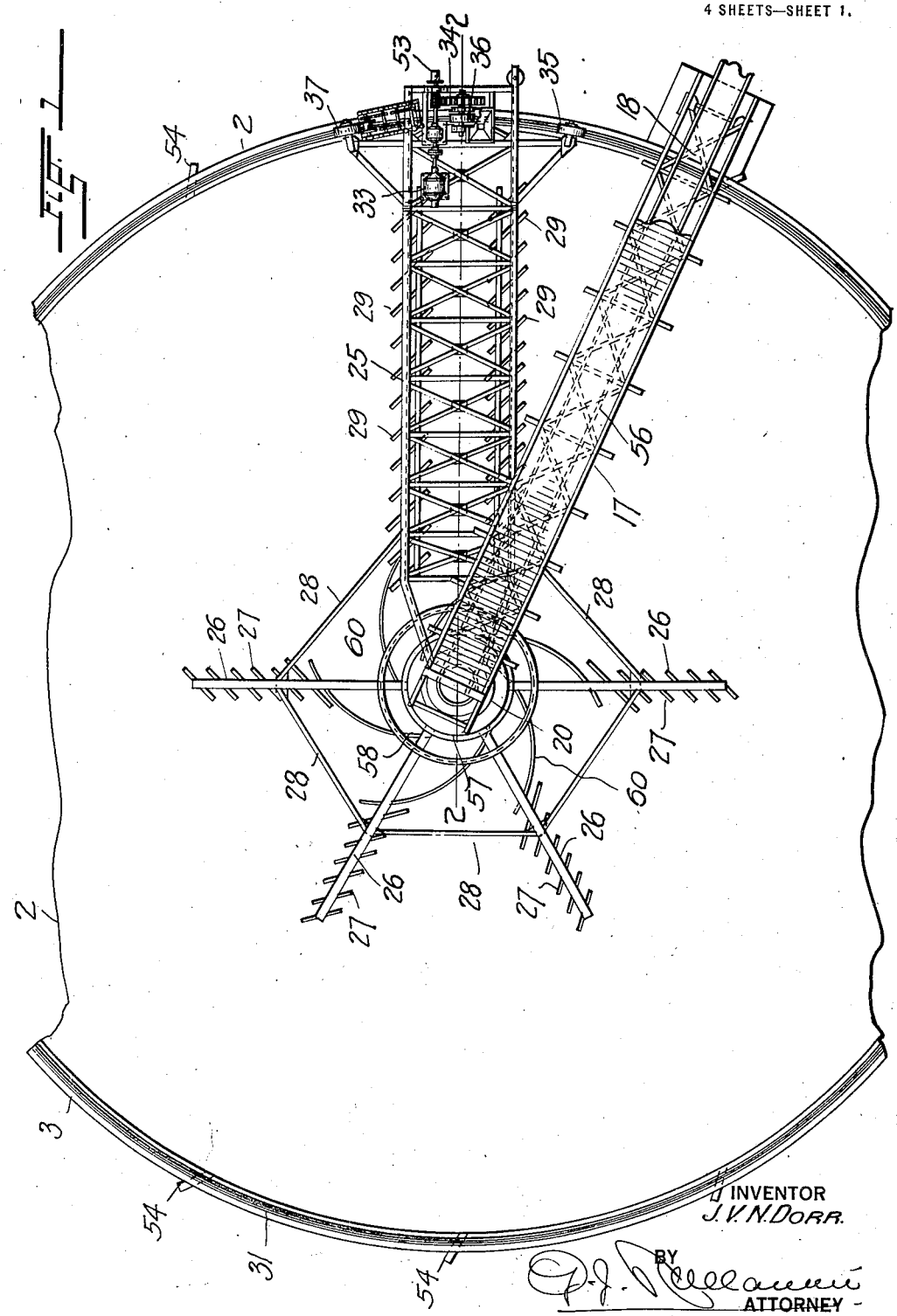

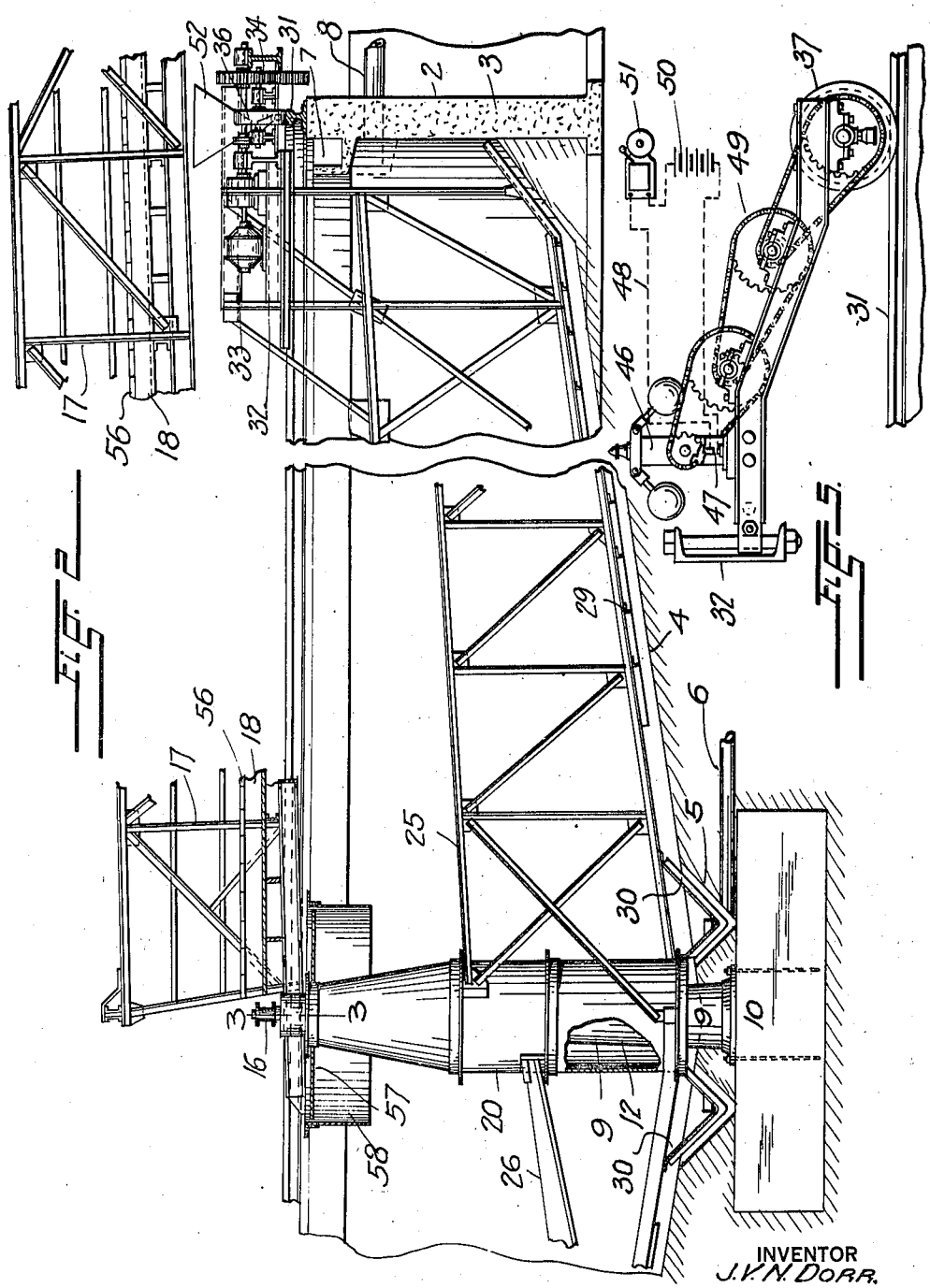

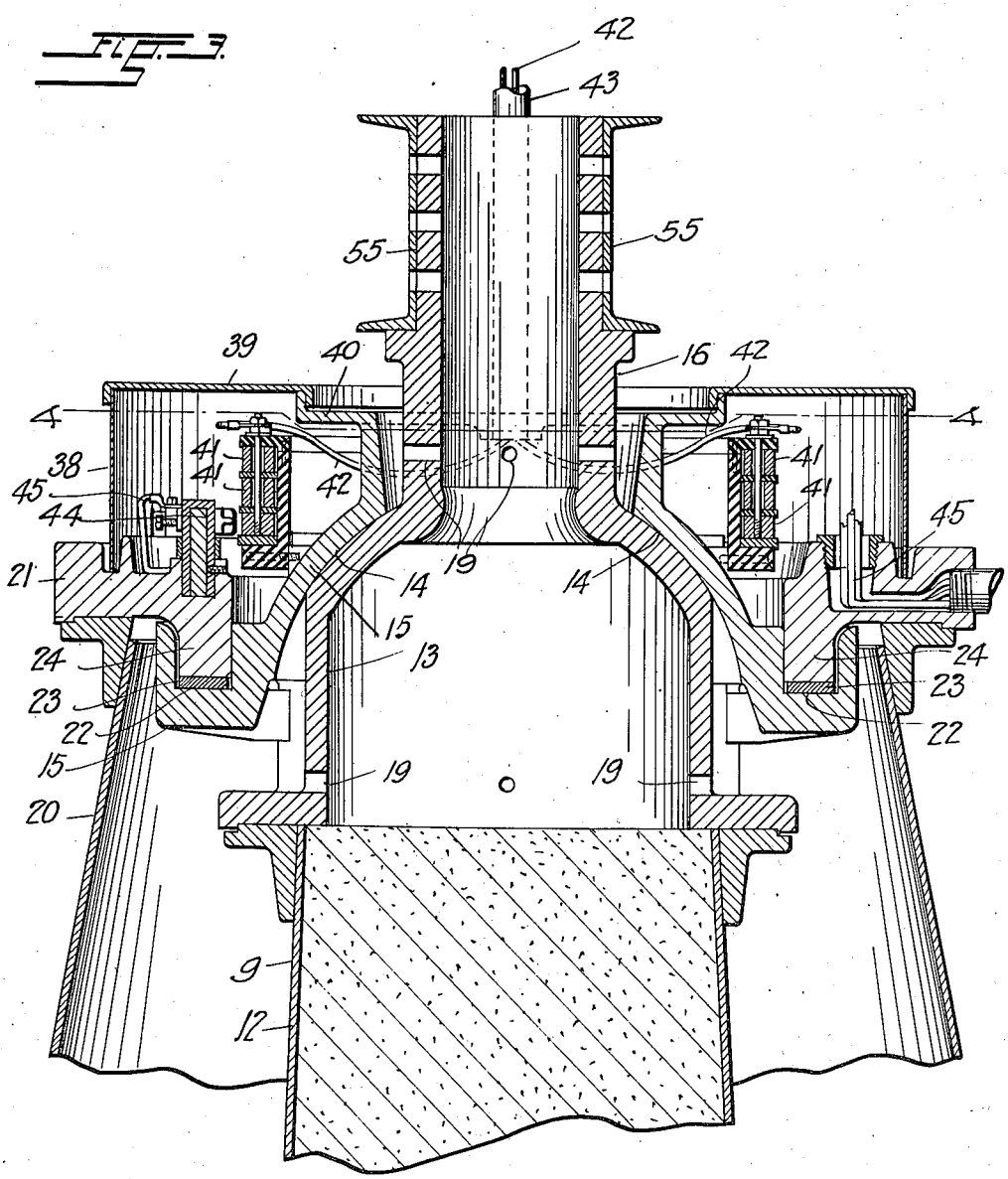

UNITED STATES PATENT OFFICE.

JOHN VAN NOSTRAND DORR, OF NEW YORK, N. Y.

THICKENER.

1,356,608.                    Specification of Letters Patent.        Patented Oct. 26, 1920.

Application filed October 2, 1917. Serial No. 194,361.

*To all whom it may concern:*

Be it known that I, JOHN VAN NOSTRAND DORR, a citizen of the United States, residing at New York city, in the county of New York and State of New York, have invented certain new and useful Improvements in Thickeners, of which the following is a specification.

This invention relates to improvements in apparatus for dewatering solids suspended in liquids, of the class commonly known as thickeners.

Apparatus of this type are used principally in the wet treatment of metalliferous ores to separate by a dewatering process, slimes and other solids from the liquid in which they are contained, and comprise in their simplest form as shown and described in my United States Patent Number 867,958, a tank having a flat or slightly sloping bottom provided with a central discharge opening, a rotary element moving the material settling upon the bottom of the tank continuously and slowly toward the discharge-opening, and a peripheral overflow across which the liquid rising out of the solids, decants into a surrounding launder.

The rotary element above referred to, consists of a series of scraper-blades on arms radiating from a vertical shaft which is suspended in the subsidence tank from a superposed bearing and which connects with a driving mechanism through the medium of a worm and worm-gear or other suitable transmission.

These means for moving the series of scrapers across the thickened matter collected upon the bottom of the settling tank while fully efficient if used in connection with tanks of ordinary size, have been found to be inadequate in tanks of greater capacity, such as those used at present in large milling plants, which range from one hundred to two hundred feet in diameter, and it is the object of the present invention to provide a mechanism particularly adapted for the efficient operation of the scraping element, irrespective of the area of the surface upon which it moves.

With this object in view, my invention consists primarily in the provision of a circular track for the support of the outer end of a driving arm or sweep with which the scraper element is operatively connected.

The element is rotatably supported on a pedestal erected upon a suitable foundation in the center of the subsidence vessel to which the mechanism is applied and it is capable of a limited self-adjustment to compensate for variations in the elevation and radius of the track, due to expansion and contraction, or other conditions.

The scraping element is rotated by a traction-wheel riding along the track, in connection with a motor which is carried upon a truck at the outer end of the arm and in case this motor is operated by electricity, I provide a simple contact device through which the motor is during the movement of the arm, maintained in constant electrical connection with a relatively stationary source of electricity.

Suitable means are provided to increase, if necessary, the rolling friction between the wheel of the self-propelling truck and the track on which it runs, and an automatic signaling device is connected with the moving parts to indicate by an audible or visible alarm, when by insufficient traction or an overload, the movement of the scraping element is reduced beyond a predetermined degree.

An embodiment of my invention has been shown in the accompanying drawings in the various views of which like parts are similarly designated, and in which Figure 1 is a fragmentary plan view of a thickener constructed in accordance with the present invention;

Fig. 2, a fragmentary section taken along the line 2—2, Fig. 1,

Fig. 3, an enlarged vertical section of the upper portion of the arm support in the center of the settling tank taken along the line 3—3, Fig. 2, Fig. 4, a horizontal section along the line 4—4, Fig. 3, Fig. 5, an enlarged elevation of the automatic signaling device by which a reduction in the speed of the self-propelling motor is indicated, and Fig. 6, a detail view of the governor included in said device.

A settling tank 2 consists of a cylindrical upright wall 3 preferably made of concrete or other plastic material, and a bottom-surface 4 slightly sloping from said wall to a central annular depression or well 5 which connects with a conduit 6 through which the thickened material settling upon the bottom surface of the tank is discharged.

A circumferential launder 7 formed at the upper edge of the tank, provides an overflow for the liquid rising out of the solids which settle upon the bottom, and a conduit 8 connecting with the launder, conveys this liquid to a conveniently disposed receptacle.

A pedestal 9 erected upon a foundation 10 extends in the vertical axis of the tank for the support of a scraping element hereinafter to be described, and in its preferred form consists of a shell 12 filled with concrete and surmounted by a hollow cap 13.

This cap has at 14 a spherical surface for the movable support of a correspondingly socketed bearing 15 from which the scraper element is rotatably suspended and it has above said surface a central extension 16 for the connection of a truss 17 which supports the launder 18 through which the feed is conducted to the center of the tank.

The cap which is open at the upper end of its central extension, is provided with openings 19 for the drainage of water.

The ball and socket joint between the bearing and cap upon which it is supported, permits of a limited gyratory movement of the bearing for the self-adjustment of the scraper element and the mechanism by which it is operated.

The scraper-element consists of a hollow hub 20 having at its upper end an annular suspension head 21 by means of which it is rotatably supported upon the bearing 15.

The latter has to this end an annular groove 22 which contains a bearing ring 23 of fiber or other suitable material, and the head 21 has a downwardly projecting rim 24 which loosely fits within the groove and bears upon the fiber ring.

The hollow hub is rigidly secured at the inner end of a trussed driving arm or sweep 25 the bottom beams of which are provided with a series of obliquely arranged transverse blades 29 which in the operation of the thickener move the settled material toward the central depression in the bottom of the tank.

The hub carries in addition to the sweep a number of radial arms 26 of shorter length which likewise are provided with series of oblique transverse blades 27, and it carries furthermore a number of scrapers 60 which are curved in the direction of rotation and extend between the hub and the series of scraperblades on the arms 26 and the sweeps 25.

The scraper blades on the arm and the sweep and the scrapers 60 coöperate to move the material settling to the bottom of the tank, continuously to the central discharge opening, it being understood that to prevent the material from accumulating and building up near the center of the tank by reason of the lesser distance traveled by the scraping element during each revolution, it is essential that the construction of the element provides for a more rapid removal of the settled material at the central portion of the tank, than nearer the periphery of the same.

Scrapers 30 secured to the arms 26 prevent the solid matter from adhering to the surface of the depression 5.

A circular rail 31 mounted upon the wall of the tank, provides an endless track for a wheeled truck 32 at the end of the driving arm of the scraping element.

The truck supports an electric motor 33 which through the instrumentality of a suitable transmission 34 has a driving connection with the middle one of three wheels, 35, 36 and 37 by which the truck is supported upon the track.

The current for operating the motor is supplied from a conveniently located source of electricity, through the medium of a contact device within an inclosure provided by a cylindrical shell 38 and a cover 39 which are supported upon the head 21 of the hub and partially upon an outwardly projecting flange 40 on the socketed bearing 15.

The contact device consists of three insulated rings 41 which are supported upon the bearing 15 and connect with the leads 42 of a three-phase circuit which are partially inclosed in a tube 43 fastened to a lug on the bearing.

The head 21 of the hub carries three brushes 44 which are in continuous contact with the rings 41 and which by means of wires 45 are connected with the motor at the outer end of the sweep.

The signaling device which by the operation of an audible or visible alarm indicates a reduction in the speed of the scraping element, caused by an overload or insufficient traction, consists of a governor 46 which controls the relative positions of the contact members of an electric switch 47 connected in an alarm circuit 48.

The governor is by means of a gear train 49 connected with one of the end wheels, 37, of the truck and operates to bring the contacts of the switch into conductive engagement when the angular velocity of the wheel diminishes beyond a predetermined degree.

The alarm circuit in which the switch is connected includes as shown in Fig. 5, a source of electricity 50 and an electrically operating alarm 51.

To increase the rolling friction between the driving wheel 36 of the self-propelling motor and the track upon which it runs, the truck may be weighted by any suitable means or sand may be applied to the track through a hopper 52.

Should the motive power at any time be insufficient to move the scraping element from a position of rest, the truck may be started along the track by a rope wound upon a drum 53 connected with the motor, and bent around one of a number of horns 54 projecting from the wall of the tank.

The material to be treated in the thickener is fed into the tank at a point adjacent its center, through the launder 18 which as mentioned hereinbefore, is supported by a truss 17 extending between the pedestal 9 and a support erected outside the tank.

The truss is at its inner end connected with the pedestal by two channel bars 55 which extend in a circumferential recess of the central extension 16 of its cap as clearly shown in Fig. 3 of the drawings.

The launder-truss slants from the center of the tank upwardly to permit of the passage of the truck on the sweep beneath it and it has above the launder a flooring 56 to provide a bridge along which the operator may pass to inspect the interior of the tank and the mechanism by which the scraping element is operated.

The material discharged through the end of the feed launder falls upon a distributing plate 57 within a chamber 58 which compels it to enter the contents of the tank below its liquid level.

Having thus described the construction of my improved thickener, I desire it understood that many variations in the construction and arrangement of its parts, may be resorted to without in any way departing from the spirit of the invention as defined in the following claims:

1. In thickening apparatus the combination with a settling tank having means for the discharge of thickened matter and a rotary element for moving matter settling in the tank, to effect its discharge by said means of a track, a sweep connected with said element, a wheel upon the track, in connection with the sweep, and mechanism for the rotation of said wheel.

2. In thickening apparatus the combination with a settling tank having means for the discharge of thickened matter and a rotary element for moving matter settling in the tank, to effect its discharge by said means, of a track, a sweep connected with said element, a wheel upon the track, in connection with the sweep, and a motor carried by the sweep in driving connection with said wheel.

3. In thickening apparatus the combination with a settling tank having means for the discharge of thickened matter and a rotary element for moving matter settling in the tank, to effect its discharge by said means, of a track, a sweep connected with said element, and a self-propelling wheeled truck on said track, in connection with the sweep.

4. In thickening apparatus the combination with a settling tank having means for the discharge of thickened matter and a rotary element for moving matter settling in the tank, to effect its discharge by said means, of means for the operation of said element, comprising a track, a sweep connected with said element, a wheel upon the track, in connection with the sweep, an electric motor carried by the sweep, in driving connection with said wheel, an electric circuit, and a contact device connecting said motor continuously in said circuit.

5. A thickening apparatus comprising a settling tank having means for the discharge of thickened matter, an element for moving matter settling in the tank, to effect its discharge by said means, mounted for rotation about a fixed axis and for lateral self-adjustment with relation thereto, a track, a sweep connected with said element and movably supported on said track, and means for moving said sweep along the track.

6. A thickening apparatus comprising a settling tank having means for the discharge of thickened matter, a pedestal, a self-adjusting bearing thereon, a hub rotatably supported on said bearing, means on said hub for moving matter settling in the tank, to effect its discharge by said means, and means to effect the rotation of the hub.

7. In thickening apparatus, the combination with a settling tank having means for the discharge of thickened matter, and a rotary element for moving settled matter to said means, of a sweep supporting the element outside its axis of rotation, a motor driving the sweep for the rotation of the element, an alarm, and a governor controlled by the motor and connected with the alarm to cause it to indicate a variation in the movement of the motor by a resistance to the movement of the element beyond a predetermined degree.

8. The combination of a settling tank having means for the discharge of thickened matter from a central region of its bottom surface, a rotary element having radial scraper-arms for moving settled matter to said region, a sweep for the propulsion of said element, and scrapers on the sweep, auxiliary to the scraper-arms, and extending outside the area of the bottom surface that they cover.

In testimony whereof I have affixed my signature in presence of two witnesses.

JOHN VAN NOSTRAND DORR.

Witnesses:
H. W. SPICER,
F. R. KACHEL.